(12) United States Patent
Miao

(10) Patent No.: US 11,696,187 B2
(45) Date of Patent: Jul. 4, 2023

(54) RESOURCE CONFIGURATION IN AN INTEGRATED ACCESS AND BACKHAUL NETWORK

(71) Applicant: Apple Inc., Cupertino, CA (US)

(72) Inventor: Honglei Miao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,003

(22) PCT Filed: May 15, 2020

(86) PCT No.: PCT/US2020/033255
§ 371 (c)(1),
(2) Date: Sep. 22, 2021

(87) PCT Pub. No.: WO2020/236644
PCT Pub. Date: Nov. 26, 2020

(65) Prior Publication Data
US 2022/0159517 A1    May 19, 2022

Related U.S. Application Data

(60) Provisional application No. 62/849,681, filed on May 17, 2019.

(51) Int. Cl.
*H04W 28/26* (2009.01)
*H04B 7/155* (2006.01)
*H04W 88/08* (2009.01)

(52) U.S. Cl.
CPC ........ *H04W 28/26* (2013.01); *H04B 7/15542* (2013.01); *H04W 88/085* (2013.01)

(58) Field of Classification Search
CPC ... H04W 28/26; H04W 88/085; H04W 28/16; H04W 92/20; H04B 7/15542
See application file for complete search history.

(56) References Cited

U.S. PATENT DOCUMENTS

| 2019/0373627 A1* | 12/2019 | Luo | H04L 1/0025 |
| 2020/0145965 A1* | 5/2020 | Luo | H04W 72/21 |
| 2020/0145993 A1* | 5/2020 | Abedini | H04L 5/0094 |
| 2020/0170010 A1* | 5/2020 | Luo | H04B 7/15542 |

(Continued)

OTHER PUBLICATIONS

[Unknown Author], "3rd Generation Partnership Project; Technical Specification Group Radio Access Network: NR: Radio Resource Control (RRC) protocol specification (Release 15)," 3GPP TS 38.331 VI 5.4.0, Dec. 2018, 474 pages.

(Continued)

*Primary Examiner* — Ashley Shivers
(74) *Attorney, Agent, or Firm* — Fish & Richardson P.C.

(57) ABSTRACT

Disclosed are methods, systems, apparatus, and computer programs for communicating new link availability configurations for a node in an integrated access and backhaul (IAB) network. In one aspect, a method includes receiving a Radio Resource Control (RRC) message from an IAB node; determining, based on the RRC message, a new resource availability configuration for a backhaul resource associated with the IAB node; and in response to determining the new resource availability configuration, conditionally communicating with the IAB node over the backhaul resource according to the new resource availability configuration.

20 Claims, 8 Drawing Sheets

(56) References Cited

U.S. PATENT DOCUMENTS

2020/0351874 A1* 11/2020 Luo .................. H04W 72/0446
2021/0176747 A1*  6/2021 Yang ..................... H04L 5/0094
2022/0191832 A1*  6/2022 Yokomakura ......... H04L 5/0092

OTHER PUBLICATIONS

[Unknown Author], "3rd Generation Partnership Project; Technical Specification Group Radio Access Network: NG-RAN; F1 application protocol (F1AP) (Release 15)," 3GPP TS 38.473 V15.4.0, Dec. 2018.

Nec, "Discussion on IAB," 3GPP TSG RAN WG1 #96bis, Rl-1904661, Xi'an, China, Apr. 8-12, 2019, 2 pages.

PCT International Preliminary Report on Patentability in International Application No. PCT/US2020/033255, dated Dec. 2, 2021, 10 pages.

PCT International Search Report and Written Opinion issued in International Application No. PCT/US2020/033255, dated Jul. 29. 2020, 16 pages.

Qualcomm Incorporated, "IAB resource management framework," 3GPP TSG RAN WG1 Meeting AH1901, R1-1900881, Taipei, Taiwan, Jan. 21-25, 2019, 10 pages.

\* cited by examiner

RESOURCE CONFIGURATION IN AN INTEGRATED ACCESS AND BACKHAUL NETWORK

CLAIM OF PRIORITY

The present application is a U.S. National Phase application under 35 U.S.C. § 371 of International Patent Application No. PCT/US2020/033255, filed on May 15, 2020, which claims priority to U.S. Provisional Patent Application No. 62/849,681 filed May 17, 2019, entitled "METHODS FOR RESOURCE CONFIGURATIONS IN RELAY NETWORK," the disclosures of each of which are incorporated herein by reference in their entirety.

BACKGROUND

User equipment (UE) can wirelessly communicate data using wireless communication networks. To wirelessly communicate data, the UE connects to a node of a radio access network (RAN) and synchronizes with the network.

SUMMARY

The present disclosure is directed towards methods, systems, apparatus, computer programs, or combinations thereof, for communicating new resource availability configurations to integrated access and backhaul (IAB) nodes.

In accordance with one aspect of the present disclosure, in an integrated access and backhaul (LAB) network, a method includes receiving a Radio Resource Control (RRC) message from an IAB node; determining, based on the RRC message, a new resource availability configuration for a backhaul resource associated with the IAB node; and in response to determining the new resource availability configuration, conditionally communicating with the IAB node over the backhaul resource according to the new resource availability configuration.

Other versions include corresponding systems, apparatus, and computer programs to perform the actions of methods defined by instructions encoded on computer readable storage devices. These and other versions may optionally include one or more of the following features.

In some implementations, the new resource availability configuration defines that the backhaul resource is hard available, and wherein communicating with the IAB node over the backhaul resource according to the new resource availability configuration includes making the backhaul resource unconditionally available for transferring backhaul data.

In some implementations, the new resource availability configuration defines that the backhaul resource is soft available, and wherein communicating with the IAB node over the backhaul resource according to the new resource availability configuration includes making the backhaul resource conditionally available for transferring backhaul data.

In some implementations, the new resource availability configuration defines that the backhaul resource is soft available, and wherein communicating with the IAB node over the backhaul resource according to the new resource availability configuration includes making the backhaul resource unavailable for transferring backhaul data.

In some implementations, the new resource availability configuration includes a hard resource availability bitmap having one or more bits and a soft resource availability bitmap having one or more bits, wherein each bit in the hard resource availability bitmap and the soft resource availability bitmap corresponds to a different backhaul resource associated with the IAB node.

In some implementations, a value of 1 in a bit in the hard resource availability bitmap indicates that the corresponding resource is unconditionally available for transferring backhaul data, and a value of 1 in a bit in the soft resource availability bitmap indicates that the corresponding resource is conditionally available for transferring backhaul data.

In some implementations, a value of 0 in a bit in both the hard resource availability bitmap and the soft resource availability bitmap indicates that the corresponding resource is unavailable for transferring backhaul data. In some implementations, the backhaul resource includes one or more of: an uplink symbol, a downlink symbol, an uplink slot, or a downlink slot.

In accordance with another aspect of the present disclosure, in an integrated access and backhaul (IAB) network comprising an IAB node, a method includes determining a new resource availability configuration for a backhaul resource associated with the IAB node; generating, in response to new resource availability configuration, a message comprising the new resource availability configuration for the backhaul resource; and transmitting the message to the IAB node.

Other versions include corresponding systems, apparatus, and computer programs to perform the actions of methods defined by instructions encoded on computer readable storage devices. These and other versions may optionally include one or more of the following features.

In some implementations, the new resource availability configuration defines that the backhaul resource is hard available, and wherein the new resource availability configuration directs the IAB node to make the backhaul resource unconditionally available for transferring backhaul data.

In some implementations, the new resource availability configuration defines that the backhaul resource is soft available, and wherein the new resource availability configuration directs the IAB node to make the backhaul resource conditionally available for transferring backhaul data.

In some implementations, the new resource availability configuration defines that the backhaul resource is unavailable, and wherein the new resource availability configuration directs the IAB node to make the backhaul resource unavailable for transferring backhaul data.

In some implementations, the new resource availability configuration includes a hard resource availability bitmap having one or more bits and a soft resource availability bitmap having one or more bits, wherein each bit in the hard resource availability bitmap and the soft resource availability bitmap corresponds to a different backhaul resource associated with the IAB node.

In some implementations, a value of 1 in a bit in the hard resource availability bitmap indicates that the corresponding resource is unconditionally available for transferring backhaul data, and a value of 1 in a bit in the soft resource availability bitmap indicates that the corresponding resource is conditionally available for transferring backhaul data.

In some implementations, a value of 0 in a bit in both the hard resource availability bitmap and the soft resource availability bitmap indicates that the corresponding resource is unavailable for transferring backhaul data.

In some implementations, the backhaul resource includes one or more of: an uplink symbol, a downlink symbol, an uplink slot, or a downlink slot.

DESCRIPTION OF DRAWINGS

Like reference numbers and designations in the various drawings indicate like elements.

DETAILED DESCRIPTION

Figure 1:
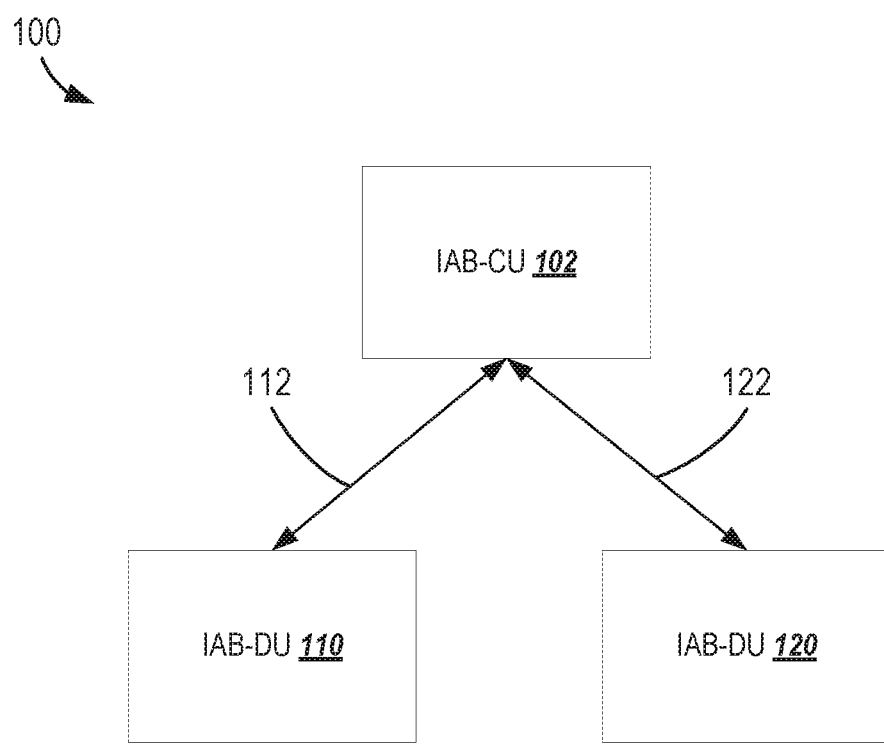
FIG. 1 is an example integrated access and backhaul (IAB) network, according to some implementations of the present disclosure.

The present disclosure is related to Integrated Access and Backhaul (IAB) networks, which is a feature that enables multi-hop routing of data (e.g., as described in 3GPP Release 16 (Rel-16)). An architecture of IAB networks generally includes an IAB donor that serves a plurality of IAB nodes that operate as relays. The IAB donor is a network node (e.g., a base station) that terminates new generation (NG) interfaces. In particular, the IAB donor may serve as an interface for a user equipment (UE) to a core network and/or may provide wireless backhauling functionality to the plurality of IAB nodes. The plurality of IAB nodes can serve as access nodes to UEs and can provide backhaul links to other IAB nodes.

The IAB network architecture implements a central unit-distributed unit (CU-DU) split. In this architecture, the plurality of IAB nodes terminate the DU functionality, and the IAB donor terminates the CU functionality. Furthermore, each IAB node may include a Mobile Termination (MT) function. An IAB node may use the MT function to connect to a parent IAB node and/or the IAB donor. Further, the IAB node may use the DU function to communicate with UEs and/or MTs of child IAB nodes. Signaling between the MTs of IAB nodes or UEs and the CU of the IAB donor may use the Radio Resource Control (RRC) protocol. Signaling between the DUs of IAB nodes and the CU of the IAB donor may use an F1-AP protocol.

In an IAB network, an IAB node can be made aware of the semi-static distributed unit (DU) resource configuration (e.g., Downlink (DL), Uplink (UL), Flexible) of all its child IAB nodes. If the full DU resource configuration information of its child IAB nodes is not necessary, only the necessary configuration information may be signaled to the IAB node. Therefore semi-static resource allocation for IAB DU resource configuration can be configured by an IAB CU (central unit) in a centralized manner. On top of the DU DL, UL and Flexible pattern, the DU configuration of Hard, Soft and Not-available (H/S/NA) is also provided, which further indicates the availability of the configured DL/UL/Flexible resources as unconditionally available, conditionally available, or unavailable. Moreover, an explicit indication of availability of a Soft resource can be also used by the parent node to make the resource available to the child node, irrespective of the outcome of any implicit determination of availability by the child node. As a result, the parent node does not need to be aware of the outcome of an implicit determination of availability of a DU Soft resource at a child node.

Due to the fact that each of the D/U/F resource type may span over more than one slot in a "D-U-F" configuration sequence pattern, different signaling options of H/S/NA with different overheads lead to different trade-off among coordination flexibility and signaling overheads.

The present disclosure describes enhancements to the radio resource control (RRC) signaling protocol to enable an IAB-CU to flexibly configure coordinated resource availabilities (e.g., H/S/NA) to children IAB-DUs in an IAB network. The described techniques may enable the IAB-CU to configure resources of the IAB-DUs in the network, and to communicate the configuration in a data efficient manner.

FIG. 1 illustrates an example IAB network 100, according to some implementations. As shown in FIG. 1A, IAB network 100 includes IAB-CU node 102, and IAB-DU nodes 110, 120. In the network 100, IAB-CU node 102 is a central unit (CU) that controls the operation of one or more distributed units (DUs), such as IAB-DU nodes 110, 120. For example, the IAB-CU node 102 may utilize the Radio Resource Control (RRC) protocol to control the operation of the IAB-DU nodes 110, 120. IAB-CU node 102 is the parent node of IAB-DU nodes 110, 120. Conversely, IAB-DU nodes 110, 120 are children of the IAB-CU node 102.

In IAB network 100, IAB-DU nodes 110, 120 may communicate with IAB-CU node 102 using backhaul (BH) resources 112, 122. BH resources 112, 122 may be radio frequency (RF) resources used for data communication between the nodes. In some implementations, the IAB-DU nodes 110, 120 may communicate directly with each other or with other IAB-DU nodes over additional BH resources.

In IAB network 100, each of the BH resources 112, 122 between the IAB-DU nodes 110, 120 and IAB-CU node 102 is associated with a resource availability (e.g., hard, soft, not available). For example, if BH resource 112 has a resource availability of "hard" (H), the resource is unconditionally available for backhaul data between the IAB-DU node 110 and the IAB-CU node 102. If BH resource 112 has a resource availability of "soft" (S), the resource is conditionally available for backhaul data between the IAB node 110 and the IAB-CU node 102. If BH resource 112 has a resource availability of "not available" (NA), the resource is not available for backhaul data between the IAB node 110 and the IAB-CU node 102. In some implementations, the resource availability for the resources 112, 122 in the IAB network 100 can be configured by the IAB-CU node 102. For example, the IAB-CU node 102 may send particular RRC information elements (IEs) including the resource configuration to the IAB-DU nodes 110, 120 to configure the availability of BH resources 112, 122.

Disclosed are methods and systems for communicating resource availability configurations to IAB nodes in an IAB network (e.g., IAB network 100). The present techniques may enable an IAB-CU (e.g., 102) to flexibly configure coordinated time resources to all children IAB-DUs (e.g., 110, 120) in the IAB network 100, which may enable the IAB network 100 to achieve greater data efficiency and better performance (e.g., data throughput).

In an embodiment, resource availability configuration, e.g., hard, soft or non-available (H/S/NA), which define the resource as unconditionally available, conditionally available and not available to IAB-DU, respectively, can be configured and signaled on slot level granularity. This can be realized by adding new parameters hardResourceSlotSet and softResourceSlotSet to TDD-UL-DL-Pattern information elements to be signaled from IAB-CU to IAB-DU via F1-AP signaling. A description the information element showing these new parameters is shown in Table 1, and a description of the parameters is shown in Table 2.

TABLE 1

TDD-UL-DL-Pattern

```
TDD-UL-DL-Pattern ::=    SEQUENCE {
  dl-UL-TransmissionPeriodicity  ENUMERATED {ms0p5, ms0p625,
  ms1, ms1p25, ms2, ms2p5, ms5, ms10},
  nrofDownlinkSlots      INTEGER (0..maxNrofSlots),
  nrofDownlinkSymbols         INTEGER (0..maxNrofSymbols-1),
  nrofUplinkSlots       INTEGER (0..maxNrofSlots),
  nrofUplinkSymbols        INTEGER (0..maxNrofSymbols-1),
  ...,
  [[
  dl-UL-TransmissionPeriodicity-v1530    ENUMERATED {ms3, ms4}
  OPTIONAL -- Need R
  ]]
  dl-UL-Order   ENUMERATED {'D-F-U', 'U-F-D', 'F-D-U', 'F-U-D',
  'D-F-D', 'U-F-U'},
  hardResourceSlotSet BIT STRING (SIZE (1..maxNrSlotsInPattern))
  OPTIONAL,
  softResourceSlotSet BIT STRING (SIZE (1..maxNrSlotsInPattern))
  OPTIONAL
}
```

In an embodiment, the resource availability configuration can be configured and signaled on symbol level granularity. This can be realized by adding new parameters hardResourceSymbolTSet and sofResourceSymbolSet to TDD-UL-DL-Pattern information elements to be signaled from IAB-CU to IAB-DU via F1-AP signaling.

A description the information element showing these new parameters is shown in Table 3, and a description of the parameters is shown in Table 4.

TABLE 3

TDD-UL-DL-Pattern

```
TDD-UL-DL-Pattern ::=    SEQUENCE {
  dl-UL-TransmissionPeriodicity  ENUMERATED {ms0p5, ms0p625,
  ms1, ms1p25, ms2, ms2p5, ms5, ms10},
  nrofDownlinkSlots      INTEGER (0..maxNrofSlots),
  nrofDownlinkSymbols        INTEGER (0..maxNrofSymbols-1),
  nrofUplinkSlots      INTEGER (0..maxNrofSlots),
  nrofUplinkSymbols       INTEGER (0..maxNrofSymbols-1),
  ...,
  [[
  dl-UL-TransmissionPeriodicity-v1530    ENUMERATED {ms3, ms4}
  OPTIONAL -- Need R
  ]]
  dl-UL-Order ENUMERATED {'D-F-U', 'U-F-D', 'F-D-U', 'F-U-D',
  'D-F-D', 'U-F-U'},
  hardResourceSymbolSet    BIT STRING (SIZE
  (1..maxNrSymbolsInPattern)) OPTIONAL
  softResourceSymbolSet   BIT STRING (SIZE
  (1..maxNrSymbolsInPattern)) OPTIONAL
}
```

TABLE 2

TDD-UL-DL-Pattern field descriptions

DL-UL-Order: Defines the DL/UL/Flexible slots/symbols sequence order.
hardResourceSlotSet: a bitmap indicating the set of slots in the pattern to be the hard resource, e.g., unconditionally available to IAB-DU. The first (left-most) bit in the bitmap corresponds to the first slot in the pattern and so on. If the bit is set to 1, the respective slot is configured as hard resource.
softResourceSlotSet: a bitmap indicating the set of slots in the pattern to be the soft resource, e.g., conditionally available to IAB-DU. The first (left-most) bit in the bitmap corresponds to the first slot in the pattern and so on. If the bit is set to 1, the respective slot is configured as soft resource.
maxNrSlotsInPattern: defines the maximum number of slots in the pattern, which can be set to a constant value, e.g., 640, or derived from dl-UL-TransmissionPeriodicity and referenceSubcarrierSpacing.
The slots which have not been set as either hard or soft resources in two bitmaps, e.g., hardResourceSlotSet and softResourceSlotSet, shall be defined as non-available slots set.
If the length of bitmaps signaling H/S slot set is fixed to a constant value, the valid length of the bitmaps is determined by the total slot number of the pattern which depends on dl-UL-TransmissionPeriodicity and referenceSubcarrierSpacing.

TABLE 4

TDD-UL-DL-Pattern field descriptions

DL-UL-Order: Defines the DL/UL/Flexible slots/symbols sequence order.
hardResourceSymbolSet: a bitmap indicating the set of symbols in the pattern to be
the hard resource, e.g., unconditionally available to IAB-DU. The first (left-most)
bit in the bitmap corresponds to the first symbol in the pattern and so on. If the bit is
set to 1, the respective symbol is configured as hard resource.
softResourceSymbolSet: a bitmap indicating the set of symbols in the pattern to be
the soft resource, e.g., conditionally available to IAB-DU. The first (left-most) bit in
the bitmap corresponds to the first symbol in the pattern and so on. If the bit is set to
1, the respective symbol is configured as soft resource.
maxNrSymbolsInPattern: defines the maximum number of symbols in the pattern,
which can be set to a constant value, e.g., 8960, or derived from dl-UL-
TransmissionPeriodicity and referenceSubcarrierSpacing.
The symbols which have not be set as either hard or soft resources in two
bitmaps, e.g., hardResourceSymbol Set and softResourceSymbol Set, shall be
defined as non-available symbols set.
If the length of bitmaps signaling H/S symbol set is fixed to a constant value,
the valid length of the bitmaps is determined by the total symbol number of
the pattern which depends on dl-UL-TransmissionPeriodicity and
referenceSubcarrierSpacing.

In an embodiment, the resource availability configuration can be configured and signaled with configurable resource granularity. For example, the resource granularity can be slot, symbol, transmission direction and transmission direction per slot. This can be realized by adding new parameters resourceConfigGranularity to TDD-UL-DL-ConfigCommon, and hardResourceSet and softResourceSet to TDD-UL-DL-Pattern information elements (IEs) to be signaled from an IAB-CU to an IAB-DU via F1-AP signaling.

A description of these information elements and parameters are shown in Tables 5 through 8.

TABLE 5

TDD-UL-DL-ConfigCommon

TDD-UL-DL-ConfigCommon ::=      SEQUENCE {
    referenceSubcarrierSpacing    SubcarrierSpacing,
    pattern1       TDD-UL-DL-Pattern,
    pattern2       TDD-UL-DL-Pattern OPTIONAL, -- Need R
    resourceConfigGranularity ENUMERATED {'slot', 'symbol',
        'transmissionDirection', 'transmissionDirectionAndSlot'},
    ...
}

TABLE 6

TDD-UL-DL-ConfigCommon field descriptions resourceConfigGranularity: defines the granularity of resource availability
signaling in TDD-UL-DL-Pattern pattern1 and pattern2. The following granularity
can be chosen:
1. Slot level: when the granularity is set to 'slot', the signaled set of H/S/NA
available resource is defined in terms of slot as in Method-1.
2. Symbol level: when the granularity is set to 'symbol', the signaled set of
H/S/NA available resource is defined in terms of symbol as in Method-2.
3. Transmission direction level: when the granularity is set to
'transmissionDirection', the signaled set of H/S/NA available resource is
defined in terms of transmission directions, e.g., DL, UL or flexible.
4. Transmission direction and slot level: when the granularity is set to
'transmissionDirectionAndSlot', the signaled set of H/S/NA available
resource is defined in terms of transmission directions per slot, e.g.,
DL/UL/Flexible per slot.

TABLE 7

TDD-U-DL-Pattern

TDD-UL-DL-Pattern ::=      SEQUENCE {
    dl-UL-TransmissionPeriodicity    ENUMERATED {ms0p5, ms0p625,
    ms1, ms1p25, ms2, ms2p5, ms5, ms10},
    nrofDownlinkSlots      INTEGER (0..maxNrofSlots),
    nrofDownlinkSymbols      INTEGER (0..maxNrofSymbols-1),
    nrofUplinkSlots      INTEGER (0..maxNrofSlots),
    nrofUplinkSymbols      INTEGER (0..maxNrofSymbols-1),
    ...,
    [[
    dl-UL-TransmissionPeriodicity-v1530    ENUMERATED {ms3, ms4}
OPTIONAL -- Need R
    ]]
    dl-UL-Order    ENUMERATED {'D-F-U', 'U-F-D', 'F-D-U', 'F-U-D',
    'D-F-D', 'U-F-U'},
    hardResourceSet    BIT STRING (SIZE (1..maxNrResourceSetsInPattern))
OPTIONAL,
    softResourceSet    BIT STRING (SIZE
(1..maxNrResourceSetsInPattern)) OPTIONAL
}

TABLE 8

TDD-UL-DL-Pattern field descriptions

Dl-UL-Order: defines the DL/UL/Flexible slots/symbols sequence order.
hardResourceSet: a bitmap indicating the set of resources, with the granularity
defined by resourceConfigGranularity in TDD-UL-DL-ConfigCommon, in the
pattern to be the hard resource, e.g., unconditionally available to IAB-DU. The first
(left-most) bit in the bitmap corresponds to the first resource set with the granularity
defined by resourceConfigGranularity in the pattern and so on. If the bit is set to 1,
the respective resource set is configured as hard resource.
softResourceSet: a bitmap indicating the set of resources, with the granularity
defined by resourceConfigGranularity in TDD-UL-DL-ConfigCommon, in the
pattern to be the soft resource, e.g., conditionally available to IAB-DU. The first
(left-most) bit in the bitmap corresponds to the first resource set with the granularity
defined by resourceConfigGranularity in the pattern and so on. If the bit is set to 1,
the respective resource set is configured as soft resource.
maxNrResourceSetsInPattern: defines the maximum number of resource sets in the
pattern, which can be set to a constant value, e.g., 8960, or derived from dl-UL-
TransmissionPeriodicity, referenceSubcarrierSpacing and
resourceConfigGranularity.
The resource sets which have not be set as either hard or soft resources in
two bitmaps, e.g., hardResourceSet and softResourceSet, shall be defined as
non-available resources set,
If the length of bitmaps signaling H/S resource set is fixed to a constant
value, the valid length of the bitmaps is determined by the total number of
the resource sets in the pattern which depends on dl-UL-
TransmissionPeriodicity, referenceSubcarrierSpacing and
resourceConfigGranularity.

Figure 2A:
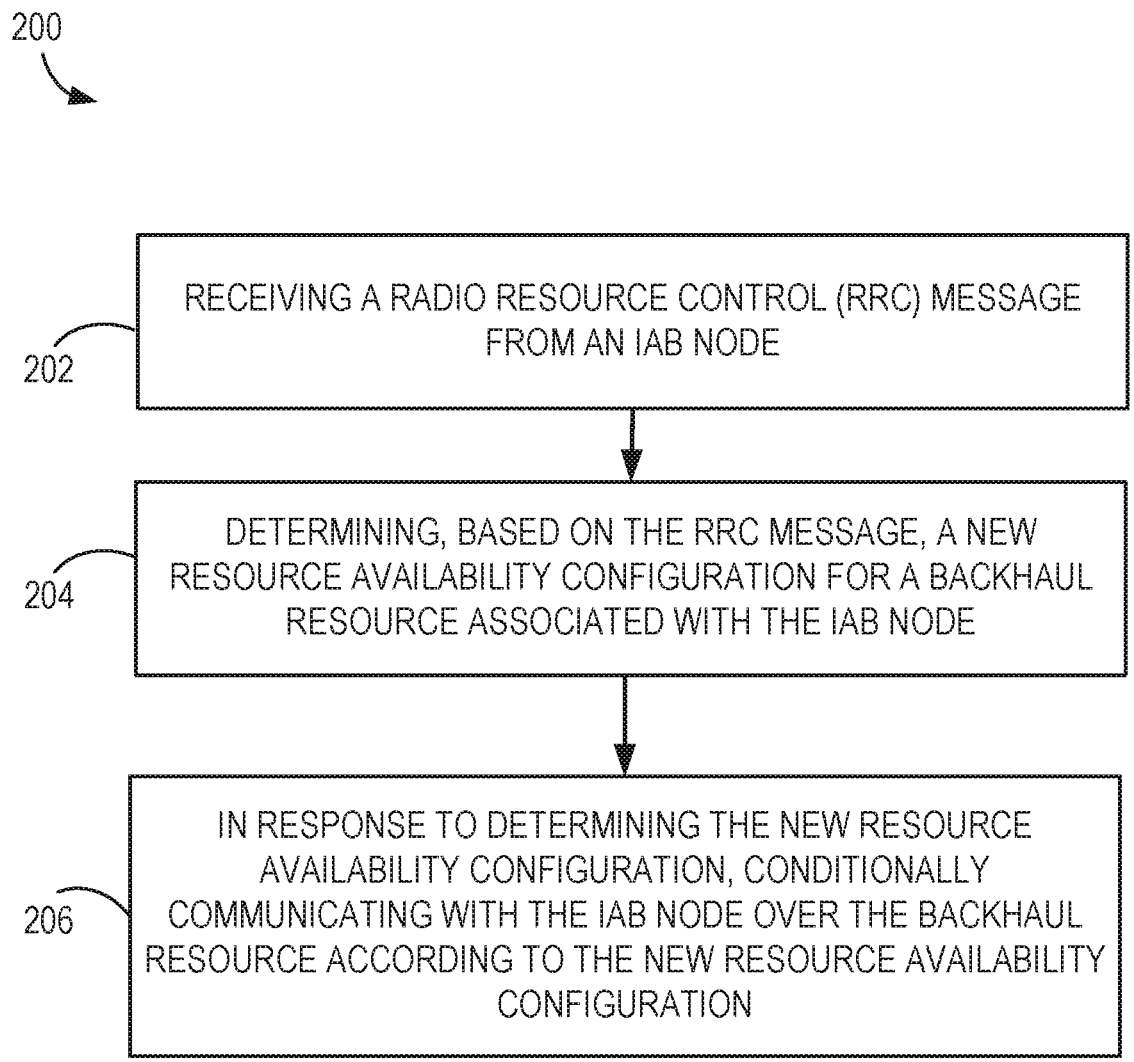
FIGS. 2A and 2B each illustrate an example method, according to some implementations of the present disclosure.
Figure 2B:
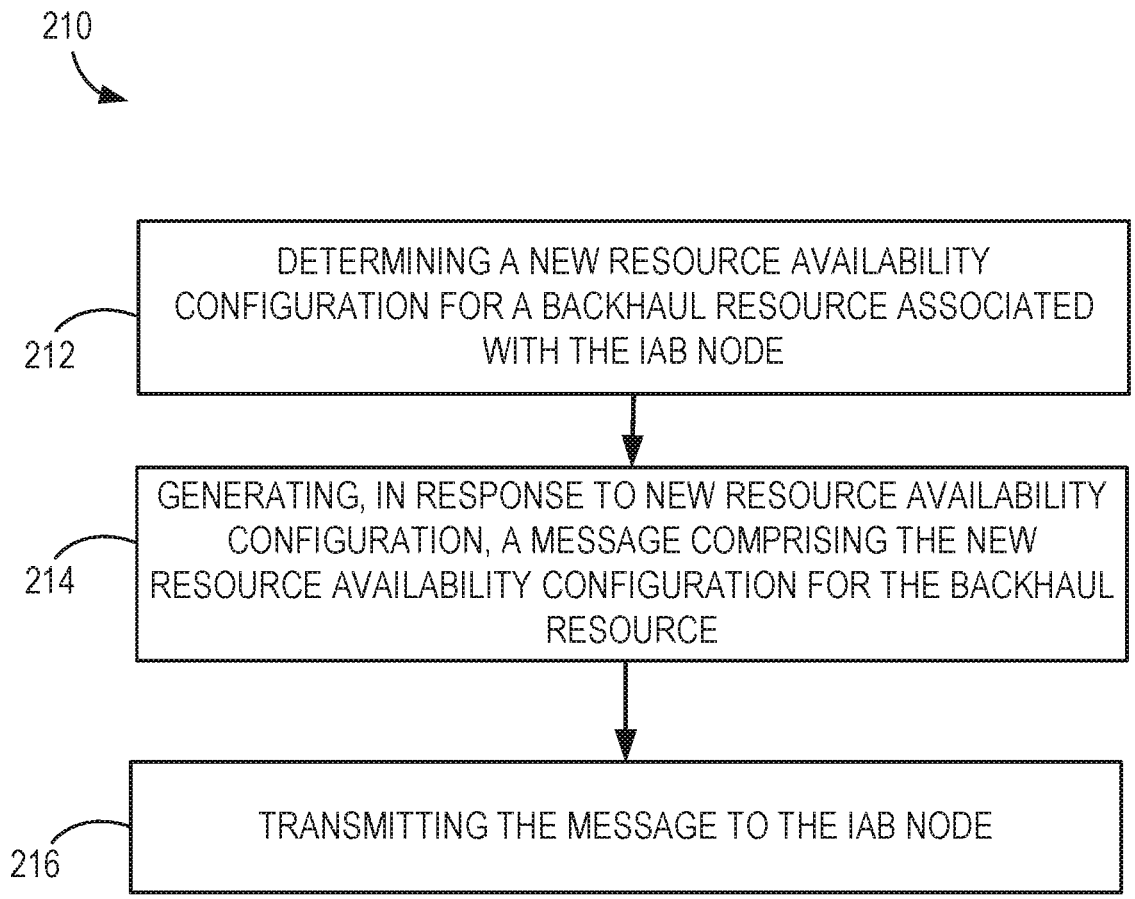

FIGS. 2A and 2B illustrate flowcharts of example processes, according to some implementations of the present disclosure. For clarity of presentation, the description that follows generally describes the processes in the context of the other figures in this description. As an example, process 200 can be performed by a base station (e.g., IAB donor) shown in FIG. 1A. As another example, process 210 can be performed by an IAB node shown in FIG. 1A. However, it will be understood that the processes may be performed, for example, by any suitable system, environment, software, and hardware, or a combination of systems, environments, software, and hardware, as appropriate. In some implementations, various steps of the processes can be run in parallel, in combination, in loops, or in any order.

FIG. 2A is a flowchart of an example process 200 for communicating new resource availability configurations to integrated access and backhaul (IAB) nodes. At step 202, the process involves receiving a Radio Resource Control (RRC) message from an IAB node. In some implementations, the RRC message is received by an IAB-DU node (e.g, 110 in FIG. 1), from an IAB-CU node (e.g., 102). At step 204, the process involves determining, based on the RRC message, a new resource availability configuration for a backhaul resource associated with the IAB node. At step 206, the process involves, in response to determining the new resource availability configuration, conditionally communicating with the IAB node over the backhaul resource according to the new resource availability configuration.

In some implementations, the new resource availability configuration defines that the backhaul resource is hard available, and wherein communicating with the IAB node over the backhaul resource according to the new resource availability configuration includes making the backhaul resource unconditionally available for transferring backhaul data.

In some implementations, the new resource availability configuration defines that the backhaul resource is soft available, and wherein communicating with the TAB node over the backhaul resource according to the new resource availability configuration includes making the backhaul resource conditionally available for transferring backhaul data.

In some implementations, the new resource availability configuration defines that the backhaul resource is soft available, and wherein communicating with the TAB node over the backhaul resource according to the new resource availability configuration includes making the backhaul resource unavailable for transferring backhaul data.

In some implementations, the new resource availability configuration includes a hard resource availability bitmap having one or more bits and a soft resource availability bitmap having one or more bits, wherein each bit in the hard resource availability bitmap and the soft resource availability bitmap corresponds to a different backhaul resource associated with the LAB node.

In some implementations, a value of 1 in a bit in the hard resource availability bitmap indicates that the corresponding resource is unconditionally available for transferring backhaul data, and a value of 1 in a bit in the soft resource availability bitmap indicates that the corresponding resource is conditionally available for transferring backhaul data.

In some implementations, a value of 0 in a bit in both the hard resource availability bitmap and the soft resource availability bitmap indicates that the corresponding resource is unavailable for transferring backhaul data. In some implementations, the backhaul resource includes one or more of: an uplink symbol, a downlink symbol, an uplink slot, or a downlink slot.

FIG. 2B is a flowchart of an example process 210. At step 212, the process involves determining a new resource availability configuration for a backhaul resource associated with the IAB node. At step 214, the process involves generating, in response to new resource availability configuration, a message comprising the new resource availability configuration for the backhaul resource. At step 216, the process involves transmitting the message to the IAB node. In some implementations, steps 212 through 216 are performed by an IAB-CU node (e.g, 102 in FIG. 1), and the message is transmitted to an IAB-DU node (e.g., 110).

In some implementations, the new resource availability configuration defines that the backhaul resource is hard available, and wherein the new resource availability configuration directs the IAB node to make the backhaul resource unconditionally available for transferring backhaul data.

In some implementations, the new resource availability configuration defines that the backhaul resource is soft available, and wherein the new resource availability configuration directs the IAB node to make the backhaul resource conditionally available for transferring backhaul data.

In some implementations, the new resource availability configuration defines that the backhaul resource is unavailable, and wherein the new resource availability configuration directs the IAB node to make the backhaul resource unavailable for transferring backhaul data.

In some implementations, the new resource availability configuration includes a hard resource availability bitmap having one or more bits and a soft resource availability bitmap having one or more bits, wherein each bit in the hard resource availability bitmap and the soft resource availability bitmap corresponds to a different backhaul resource associated with the IAB node.

In some implementations, a value of 1 in a bit in the hard resource availability bitmap indicates that the corresponding resource is unconditionally available for transferring backhaul data, and a value of 1 in a bit in the soft resource availability bitmap indicates that the corresponding resource is conditionally available for transferring backhaul data.

In some implementations, a value of 0 in a bit in both the hard resource availability bitmap and the soft resource availability bitmap indicates that the corresponding resource is unavailable for transferring backhaul data.

In some implementations, the backhaul resource includes one or more of: an uplink symbol, a downlink symbol, an uplink slot, or a downlink slot.

The example processes shown in FIGS. 2A and 2B can be modified or reconfigured to include additional, fewer, or different steps (not shown in FIGS. 2A and 2B), which can be performed in the order shown or in a different order.

Figure 3:
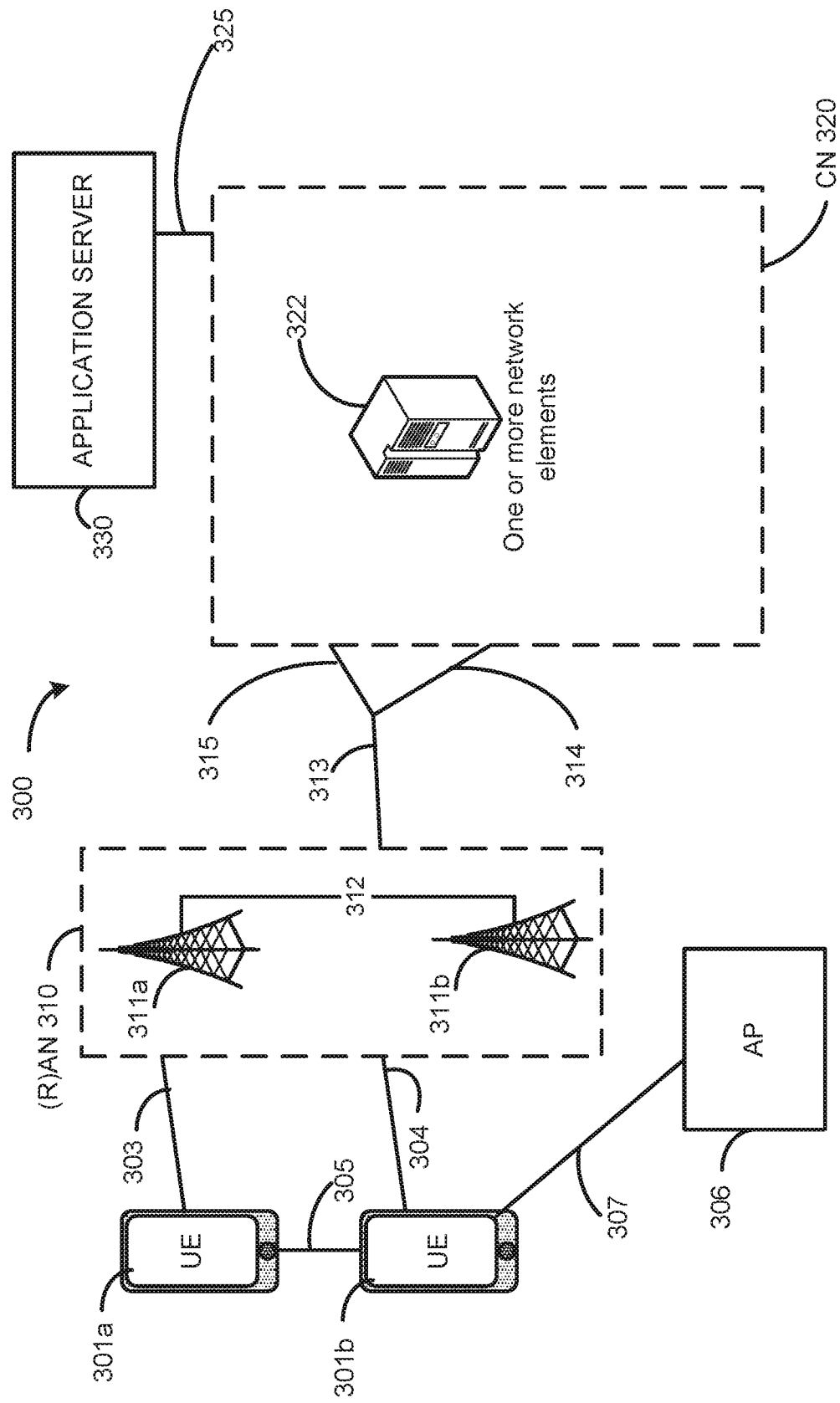
FIG. 3 is an example architecture of a system of a network, according to some implementations of the present disclosure.

FIG. 3 illustrates an example architecture of a system 300 of a network, in accordance with various embodiments. The following description is provided for an example system 300 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 3, the system 300 includes UE 301a and UE 301b (collectively referred to as "UEs 301" or "UE 301"). In this example, UEs 301 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 301 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 301 may be configured to connect, for example, communicatively couple, with a RAN 310. In embodiments, the RAN 310 may be an NG RAN or a 5G RAN, an E-UTRAN, or a legacy RAN, such as a UTRAN or GERAN. As used herein, the term "NG RAN" or the like may refer to a RAN 310 that operates in an NR or 5G system 300, and the term "E-UTRAN" or the like may refer to a RAN 310 that operates in an LTE or 4G system 300. The UEs 301 utilize connections (or channels) 303 and 304, respectively, each of which comprises a physical communications interface or layer (discussed in further detail below).

In this example, the connections 303 and 304 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 301 may directly exchange communication data via a ProSe interface 305. The ProSe interface 305 may alternatively be referred to as a SL interface 305 and may comprise one or more logical channels, including but not limited to a PSCCH, a PSSCH, a PSDCH, and a PSBCH.

The UE 301b is shown to be configured to access an AP 306 (also referred to as "WLAN node 306," "WLAN 306," "WLAN Termination 306," "WT 306" or the like) via connection 307. The connection 307 can comprise a local wireless connection, such as a connection consistent with any IEEE 802.11 protocol, wherein the AP 306 would comprise a wireless fidelity (Wi-Fi®) router. In this example, the AP 306 is shown to be connected to the Internet without connecting to the core network of the wireless system (described in further detail below). In various embodiments, the UE 301b, RAN 310, and AP 306 may be configured to utilize LWA operation and/or LWIP operation. The LWA operation may involve the UE 301b in RRC_CONNECTED being configured by a RAN node 311a-b to utilize radio resources of LTE and WLAN. LWIP operation may involve the UE 301b using WLAN radio resources (e.g., connection 307) via IPsec protocol tunneling to authenticate and encrypt packets (e.g., IP packets) sent over the connection 307. IPsec tunneling may include encapsulating the entirety of original IP packets and adding a new packet header, thereby protecting the original header of the IP packets.

The RAN 310 can include one or more AN nodes or RAN nodes 311a and 311b (collectively referred to as "RAN nodes 311" or "RAN node 311") that enable the connections 303 and 304. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 311 that operates in an NR or 5G system 300 (for example, a gNB), and the term "E-UTRAN node" or the like may refer to a RAN node 311 that operates in an LTE or 4G system 300 (e.g., an eNB). According to various embodiments, the RAN nodes 311 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 311 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 311; a MAC/PHY split wherein RRC, PDCP, RLC, and MAC layers are operated by the CRAN/vBBUP and the PHY layer is operated by individual RAN nodes 311; or a "lower PHY" split wherein RRC, PDCP, RLC, MAC layers and upper portions of the PHY layer are operated by the CRAN/vBBUP and lower portions of the PHY layer are operated by individual RAN nodes 311. This virtualized framework allows the freed-up processor cores of the RAN nodes 311 to perform other virtualized applications. In some implementations, an individual RAN node 311 may represent individual gNB-DUs that are connected to a gNB-CU via individual F1 interfaces (not shown by FIG. 3). In these implementations, the gNB-DUs may include one or more remote radio heads or RFEMs (see, e.g., FIG. 5), and the gNB-CU may be operated by a server that is located in the RAN 310 (not shown) or by a server pool in a similar manner as the CRAN/vBBUP. Additionally or alternatively, one or more of the RAN nodes 311 may be next generation eNBs (ng-eNBs), which are RAN nodes that provide E-UTRA user plane and control plane protocol terminations toward the UEs 301, and are connected to a 5GC via an NG interface (discussed infra).

In V2X scenarios one or more of the RAN nodes 311 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 301 (vUEs 301). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 311 can terminate the air interface protocol and can be the first point of contact for the UEs 301. In some embodiments, any of the RAN nodes 311 can fulfill various logical functions for the RAN 310 including, but not limited to, radio network controller (RNC) functions such as radio bearer management, uplink and downlink dynamic radio resource management and data packet scheduling, and mobility management.

In embodiments, the UEs 301 can be configured to communicate using OFDM communication signals with each other or with any of the RAN nodes 311 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 311 to the UEs 301, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 301 and the RAN nodes 311 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 301 and the RAN nodes 311 may operate using LAA, eLAA, and/or feLAA mechanisms. In these implementations, the UEs 301 and the RAN nodes 311 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 301 RAN nodes 311, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 301, AP 306, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 301 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 301. The PDCCH carries information about the transport format and resource allocations related to the PDSCH channel, among other things. It may also inform the UEs 301 about the transport format, resource allocation, and HARQ information related to the uplink shared channel. Typically, downlink scheduling (assigning control and shared channel resource blocks to the UE 301b within a cell) may be performed at any of the RAN nodes 311 based on channel quality information fed back from any of the UEs 301. The downlink resource assignment information may be sent on the PDCCH used for (e.g., assigned to) each of the UEs 301.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 311 may be configured to communicate with one another via interface 312. In embodiments where the system 300 is an LTE system (e.g., when CN 320 is an EPC 420 as in FIG. 4), the interface 312 may be an X2 interface 312. The X2 interface may be defined between two or more RAN nodes 311 (e.g., two or more eNBs and the like) that connect to EPC 320, and/or between two eNBs connecting to EPC 320. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 301 from an SeNB for user data; information of PDCP PDUs that were not delivered to a UE 301; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 300 is a 5G or NR system, the interface 312 may be an Xn interface 312. The Xn interface is defined between two or more RAN nodes 311 (e.g., two or more gNBs and the like) that connect to 5GC 320, between a RAN node 311 (e.g., a gNB) connecting to 5GC 320 and an eNB, and/or between two eNBs connecting to 5GC 320. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 301 in a connected mode (e.g., CM-CONNECTED) including functionality to manage the UE mobility for connected mode between one or more RAN nodes 311. The mobility support may include context transfer from an old (source) serving RAN node 311 to new (target) serving RAN node 311; and control of user plane tunnels between old (source) serving RAN node 311 to new (target) serving RAN node 311. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 310 is shown to be communicatively coupled to a core network—in this embodiment, core network (CN) 320. The CN 320 may comprise a plurality of network elements 322, which are configured to offer various data and telecommunications services to customers/subscribers (e.g., users of UEs 301) who are connected to the CN 320 via the RAN 310. The components of the CN 320 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 320 may be referred to as a network slice, and a logical instantiation of a portion of the CN 320 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 330 may be an element offering applications that use IP bearer resources with the core network (e.g., UMTS PS domain, LTE PS data services, etc.). The application server 330 can also be configured to support one or more communication services (e.g., VoIP sessions, PTT sessions, group communication sessions, social networking services, etc.) for the UEs 301 via the EPC 320.

In embodiments, the CN 320 may be a 5GC (referred to as "5GC 320" or the like), and the RAN 310 may be connected with the CN 320 via an NG interface 313. In embodiments, the NG interface 313 may be split into two parts, an NG user plane (NG-U) interface 314, which carries traffic data between the RAN nodes 311 and a UPF, and the S1 control plane (NG-C) interface 315, which is a signaling interface between the RAN nodes 311 and AMFs.

In embodiments, the CN 320 may be a 5G CN (referred to as "5GC 320" or the like), while in other embodiments, the CN 320 may be an EPC). Where CN 320 is an EPC (referred to as "EPC 320" or the like), the RAN 310 may be connected with the CN 320 via an S1 interface 313. In embodiments, the S1 interface 313 may be split into two parts, an S1 user plane (S1-U) interface 314, which carries traffic data between the RAN nodes 311 and the S-GW, and the S1-MME interface 315, which is a signaling interface between the RAN nodes 311 and MMEs.

Figure 4:
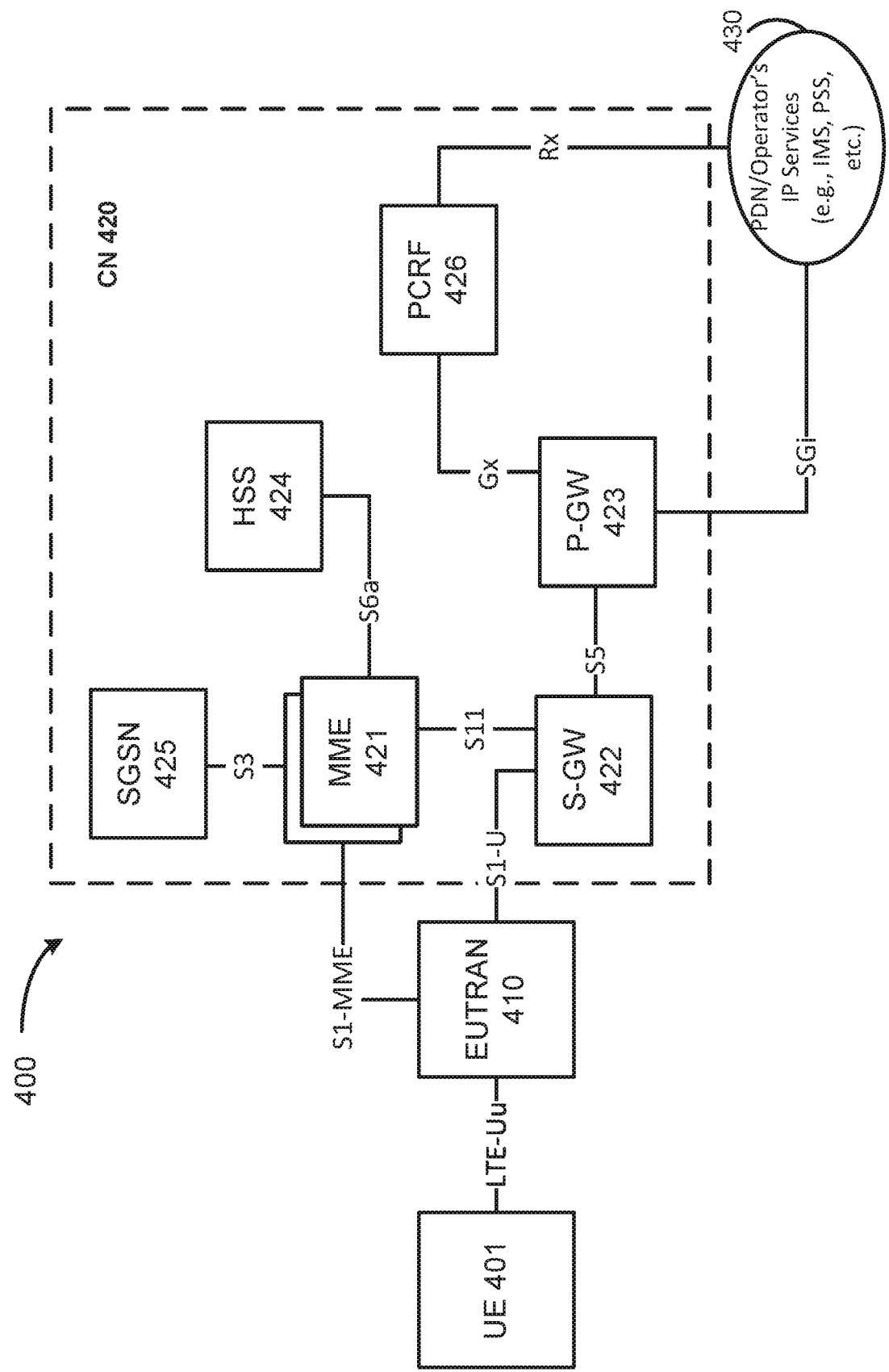
FIG. 4 illustrates an example architecture of a system including a CN, according to some implementations of the present disclosure.

FIG. 4 illustrates an example architecture of a system 400 including a first CN 420, in accordance with various embodiments. In this example, system 400 may implement the LTE standard wherein the CN 420 is an EPC 420 that corresponds with CN 320 of FIG. 3. Additionally, the UE 401 may be the same or similar as the UEs 301 of FIG. 3, and the E-UTRAN 410 may be a RAN that is the same or similar to the RAN 310 of FIG. 3, and which may include RAN nodes 311 discussed previously. The CN 420 may comprise MMEs 421, an S-GW 422, a P-GW 423, a HSS 424, and a SGSN 425.

The MMEs 421 may be similar in function to the control plane of legacy SGSN, and may implement MM functions to keep track of the current location of a UE 401. The MMEs 421 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 401, provide user identity confidentiality, and/or perform other like services to users/subscribers. Each UE 401 and the MME 421 may include an MM or EMM sublayer, and an MM context may be established in the UE 401 and the MME 421 when an attach procedure is successfully completed. The MM context may be a data structure or database object that stores MM-related information of the UE 401. The MMEs 421 may be coupled with the HSS 424 via an S6a reference point, coupled with the SGSN 425 via an S3 reference point, and coupled with the S-GW 422 via an S11 reference point.

The SGSN 425 may be a node that serves the UE 401 by tracking the location of an individual UE 401 and performing security functions. In addition, the SGSN 425 may perform Inter-EPC node signaling for mobility between 2G/3G and E-UTRAN 3GPP access networks; PDN and S-GW selection as specified by the MMEs 421; handling of UE 401 time zone functions as specified by the MMEs 421; and MME selection for handovers to E-UTRAN 3GPP access network. The S3 reference point between the MMEs 421 and the SGSN 425 may enable user and bearer information exchange for inter-3GPP access network mobility in idle and/or active states.

The HSS 424 may comprise a database for network users, including subscription-related information to support the network entities' handling of communication sessions. The EPC 420 may comprise one or several HSSs 424, depending on the number of mobile subscribers, on the capacity of the equipment, on the organization of the network, etc. For example, the HSS 424 can provide support for routing/roaming, authentication, authorization, naming/addressing resolution, location dependencies, etc. An S6a reference point between the HSS 424 and the MMEs 421 may enable transfer of subscription and authentication data for authenticating/authorizing user access to the EPC 420 between HSS 424 and the MMEs 421.

The S-GW 422 may terminate the S1 interface 313 ("S1-U" in FIG. 4) toward the RAN 410, and routes data packets between the RAN 410 and the EPC 420. In addition, the S-GW 422 may be a local mobility anchor point for inter-RAN node handovers and also may provide an anchor for inter-3GPP mobility. Other responsibilities may include lawful intercept, charging, and some policy enforcement. The S11 reference point between the S-GW 422 and the MMEs 421 may provide a control plane between the MMEs 421 and the S-GW 422. The S-GW 422 may be coupled with the P-GW 423 via an S5 reference point.

The P-GW 423 may terminate an SGi interface toward a PDN 430. The P-GW 423 may route data packets between the EPC 420 and external networks such as a network including the application server 330 (alternatively referred to as an "AF") via an IP interface 325 (see e.g., FIG. 3). In embodiments, the P-GW 423 may be communicatively coupled to an application server (application server 330 of FIG. 3 or PDN 430 in FIG. 4) via an IP communications interface 325 (see, e.g., FIG. 3). The S5 reference point between the P-GW 423 and the S-GW 422 may provide user plane tunneling and tunnel management between the P-GW 423 and the S-GW 422. The S5 reference point may also be used for S-GW 422 relocation due to UE 401 mobility and if the S-GW 422 needs to connect to a non-collocated P-GW 423 for the required PDN connectivity. The P-GW 423 may further include a node for policy enforcement and charging data collection (e.g., PCEF (not shown)). Additionally, the SGi reference point between the P-GW 423 and the packet data network (PDN) 430 may be an operator external public, a private PDN, or an intra operator packet data network, for example, for provision of MS services. The P-GW 423 may be coupled with a PCRF 426 via a Gx reference point.

PCRF 426 is the policy and charging control element of the EPC 420. In a non-roaming scenario, there may be a single PCRF 426 in the Home Public Land Mobile Network (HPLMN) associated with a UE 401's Internet Protocol Connectivity Access Network (IP-CAN) session. In a roaming scenario with local breakout of traffic, there may be two PCRFs associated with a UE 401's IP-CAN session, a Home PCRF (H-PCRF) within an HPLMN and a Visited PCRF (V-PCRF) within a Visited Public Land Mobile Network (VPLMN). The PCRF 426 may be communicatively coupled to the application server 430 via the P-GW 423. The application server 430 may signal the PCRF 426 to indicate a new service flow and select the appropriate QoS and charging parameters. The PCRF 426 may provision this rule into a PCEF (not shown) with the appropriate TFT and QCI, which commences the QoS and charging as specified by the application server 430. The Gx reference point between the PCRF 426 and the P-GW 423 may allow for the transfer of QoS policy and charging rules from the PCRF 426 to PCEF in the P-GW 423. An Rx reference point may reside between the PDN 430 (or "AF 430") and the PCRF 426.

Figure 5:
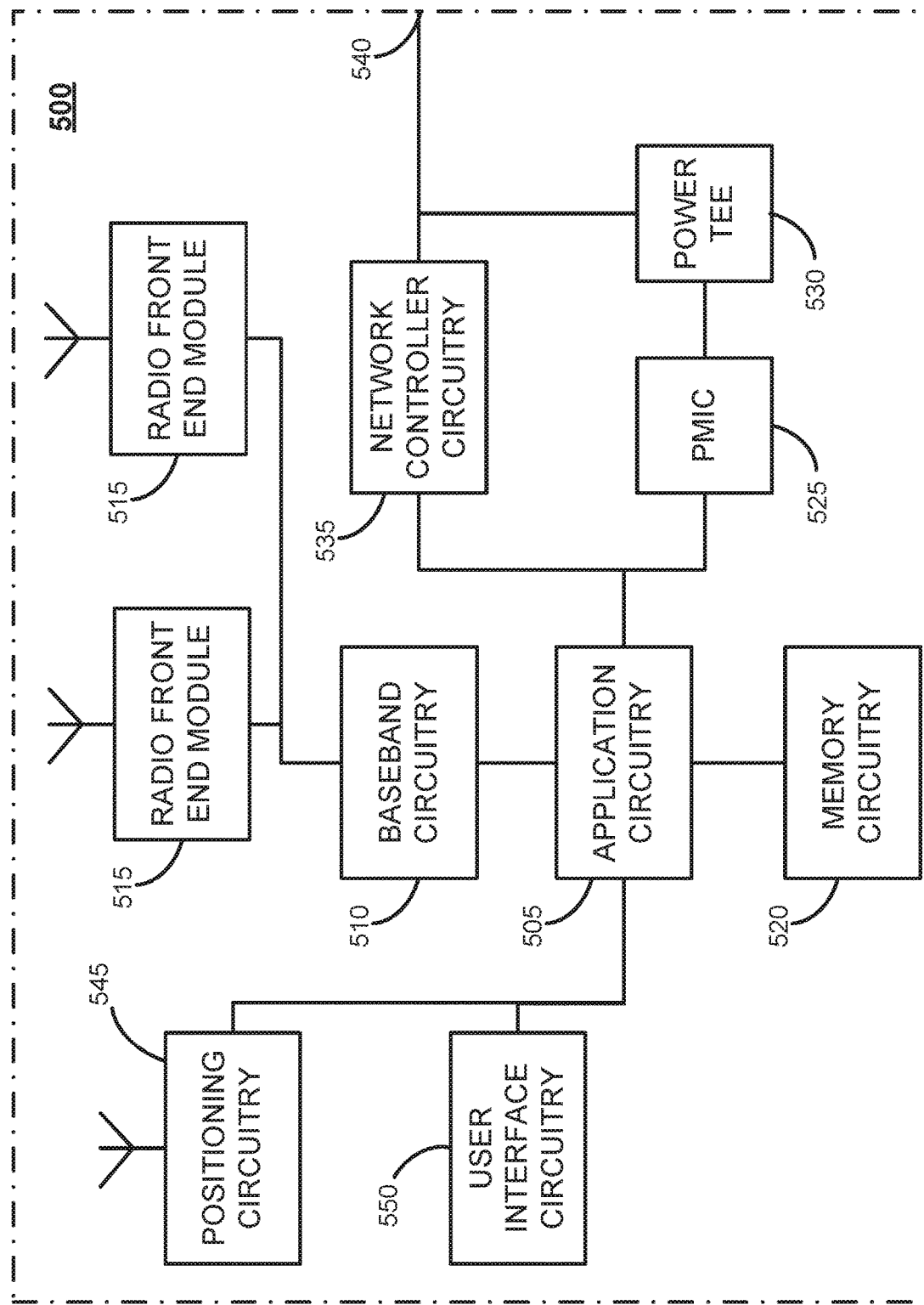
FIG. 5 is a block diagram of an example of infrastructure equipment, according to some implementations of the present disclosure.

FIG. 5 illustrates an example of infrastructure equipment 500 in accordance with various embodiments. The infrastructure equipment 500 (or "system 500") may be implemented as a base station, radio head, RAN node such as the RAN nodes 311 and/or AP 306 shown and described previously, application server(s) 330, and/or any other element/device discussed herein. In other examples, the system 500 could be implemented in or by a UE.

The system 500 includes application circuitry 505, baseband circuitry 510, one or more radio front end modules (RFEMs) 515, memory circuitry 520, power management integrated circuitry (PMIC) 525, power tee circuitry 530, network controller circuitry 535, network interface connector 540, satellite positioning circuitry 545, and user interface circuitry 550. In some embodiments, the device 500 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 505 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 505 may comprise, or may be, a special-purpose processor/controller to operate according to the various embodiments herein. As examples, the processor(s) of application circuitry 505 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors, and/or the like. In some embodiments, the system 500 may not utilize application circuitry 505, and instead may include a special-purpose processor/controller to process IP data received from an EPC or 5GC, for example.

In some implementations, the application circuitry 505 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits.

User interface circuitry 550 may include one or more user interfaces designed to enable user interaction with the system 500 or peripheral component interfaces designed to enable peripheral component interaction with the system 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 520 may be implemented as one or more of solder down packaged integrated circuits, socketed memory modules and plug-in memory cards.

The PMIC 525 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 530 may provide for electrical power drawn from a network cable to provide both power supply and data connectivity to the infrastructure equipment 500 using a single cable.

The network controller circuitry 535 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 500 via network interface connector 540 using a physical connection, which may be electrical (commonly referred to as a "copper interconnect"), optical, or wireless. The network controller circuitry 535 may include one or more dedicated processors and/or FPGAs to communicate using one or more of the aforementioned protocols. In some implementations, the network controller circuitry 535 may include multiple controllers to provide connectivity to other networks using the same or different protocols.

The positioning circuitry 545 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-Technology for Positioning, Navigation, and Timing (Micro-PNT) IC that uses a master timing clock to perform position tracking/estimation without GNSS assistance. The positioning circuitry 545 may also be part of, or interact with, the baseband circuitry 510 and/or RFEMs 515 to communicate with the nodes and components of the positioning network. The positioning circuitry 545 may also provide position data and/or time data to the application circuitry 505, which may use the data to synchronize operations with various infrastructure (e.g., RAN nodes 311, etc.), or the like.

The components shown by FIG. 5 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 6:
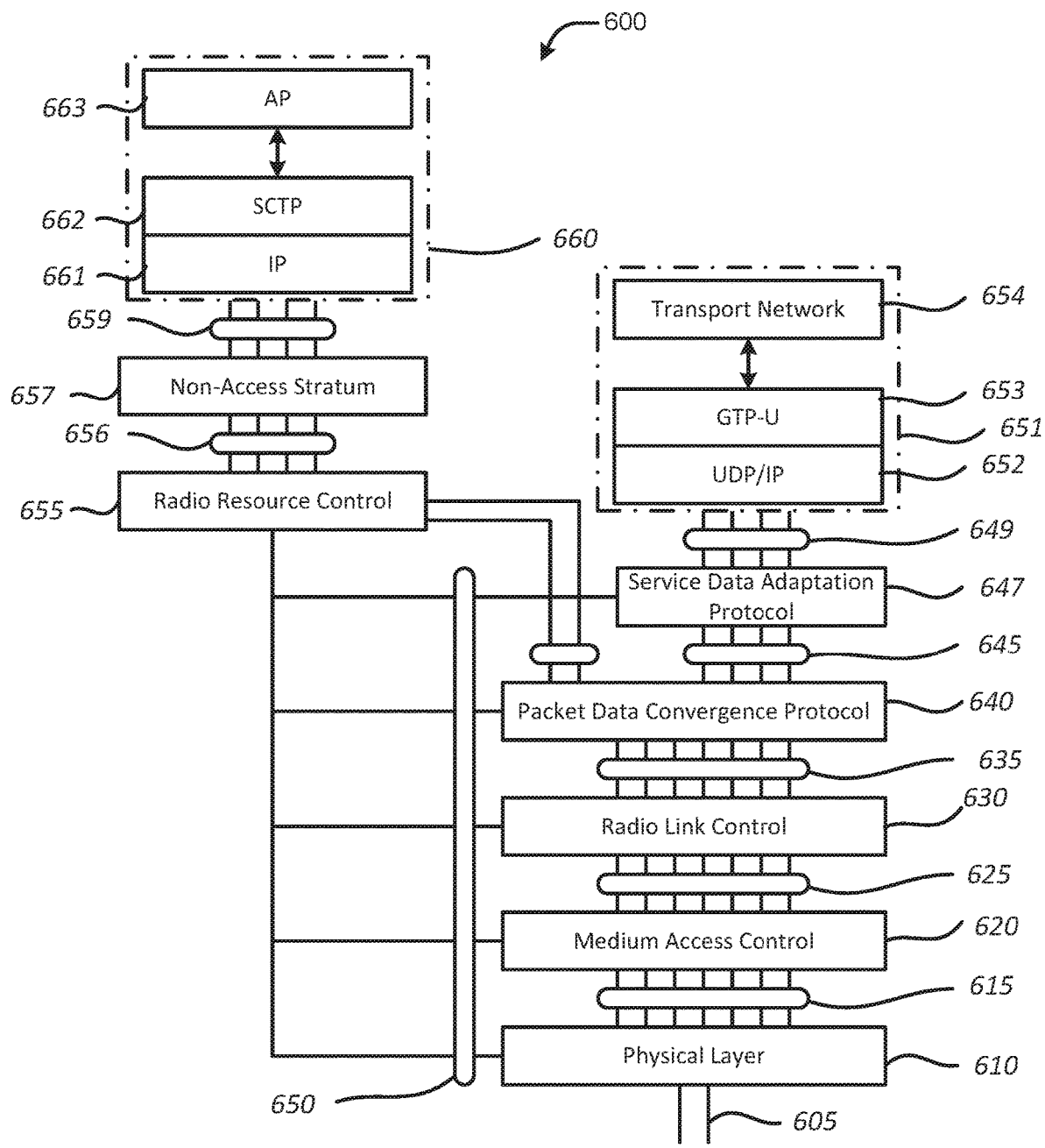
FIG. 6 is a block diagram of various protocol functions that may be implemented in a wireless communication device, according to some implementations of the present disclosure.

FIG. 6 illustrates various protocol functions that may be implemented in a wireless communication device according to various embodiments. In particular, FIG. 6 includes an arrangement 600 showing interconnections between various protocol layers/entities. The following description of FIG. 6 is provided for various protocol layers/entities that operate in conjunction with the 5G/NR system standards and LTE system standards, but some or all of the aspects of FIG. 6 may be applicable to other wireless communication network systems as well.

The protocol layers of arrangement 600 may include one or more of PHY 610, MAC 620, RLC 630, PDCP 640, SDAP 647, RRC 655, and NAS layer 657, in addition to other higher layer functions not illustrated. The protocol layers may include one or more service access points (e.g., items 659, 656, 650, 649, 645, 635, 625, and 615 in FIG. 6) that may provide communication between two or more protocol layers.

The PHY 610 may transmit and receive physical layer signals 605 that may be received from or transmitted to one or more other communication devices. The physical layer signals 605 may comprise one or more physical channels, such as those discussed herein. The PHY 610 may further perform link adaptation or adaptive modulation and coding (AMC), power control, cell search (e.g., for initial synchronization and handover purposes), and other measurements used by higher layers, such as the RRC 655. The PHY 610 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 610 may process requests from and provide indications to an instance of MAC 620 via one or more PHY-SAP 615. According to some embodiments, requests and indications communicated via PHY-SAP 615 may comprise one or more transport channels.

Instance(s) of MAC 620 may process requests from, and provide indications to, an instance of RLC 630 via one or more MAC-SAPs 625. These requests and indications communicated via the MAC-SAP 625 may comprise one or more logical channels. The MAC 620 may perform mapping between the logical channels and transport channels, multiplexing of MAC SDUs from one or more logical channels onto TBs to be delivered to PHY 610 via the transport channels, de-multiplexing MAC SDUs to one or more logical channels from TBs delivered from the PHY 610 via transport channels, multiplexing MAC SDUs onto TBs, scheduling information reporting, error correction through HARQ, and logical channel prioritization.

Instance(s) of RLC 630 may process requests from and provide indications to an instance of PDCP 640 via one or more radio link control service access points (RLC-SAP) 635. These requests and indications communicated via RLC-SAP 635 may comprise one or more RLC channels. The RLC 630 may operate in a plurality of modes of operation, including: Transparent Mode (TM), Unacknowledged Mode (UM), and Acknowledged Mode (AM). The RLC 630 may execute transfer of upper layer protocol data units (PDUs), error correction through automatic repeat request (ARQ) for AM data transfers, and concatenation, segmentation and reassembly of RLC SDUs for UM and AM data transfers. The RLC 630 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 640 may process requests from and provide indications to instance(s) of RRC 655 and/or instance(s) of SDAP 647 via one or more packet data convergence protocol service access points (PDCP-SAP) 645. These requests and indications communicated via PDCP-SAP 645 may comprise one or more radio bearers. The PDCP 640 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 647 may process requests from and provide indications to one or more higher layer protocol entities via one or more SDAP-SAP 649. These requests and indications communicated via SDAP-SAP 649 may comprise one or more QoS flows. The SDAP 647 may map QoS flows to DRBs, and vice versa, and may also mark QFIs in DL and UL packets. A single SDAP entity 647 may be configured for an individual PDU session. In the UL direction, the NG-RAN 310 may control the mapping of QoS Flows to DRB(s) in two different ways, reflective mapping or explicit mapping. For reflective mapping, the SDAP 647 of a UE 301 may monitor the QFIs of the DL packets for each DRB, and may apply the same mapping for packets flowing in the UL direction. For a DRB, the SDAP 647 of the UE 301 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 655 configuring the SDAP 647 with an explicit QoS flow to DRB mapping rule, which may be stored and followed by the SDAP 647. In embodiments, the SDAP 647 may only be used in NR implementations and may not be used in LTE implementations.

The RRC 655 may configure, via one or more management service access points (M-SAP), aspects of one or more protocol layers, which may include one or more instances of PHY 610, MAC 620, RLC 630, PDCP 640 and SDAP 647. In embodiments, an instance of RRC 655 may process requests from and provide indications to one or more NAS entities 657 via one or more RRC-SAPs 656. The main services and functions of the RRC 655 may include broadcast of system information (e.g., included in MIBs or SIBs related to the NAS), broadcast of system information related to the access stratum (AS), paging, establishment, maintenance and release of an RRC connection between the UE 301 and RAN 310 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 657 may form the highest stratum of the control plane between the UE 301 and the AMF. The NAS 657 may support the mobility of the UEs 301 and the session management procedures to establish and maintain IP connectivity between the UE 301 and a P-GW in LTE systems.

According to various embodiments, one or more protocol entities of arrangement 600 may be implemented in UEs 301, RAN nodes 311, AMF in NR implementations or MME 421 in LTE implementations, UPF in NR implementations or S-GW 422 and P-GW 423 in LTE implementations, or the like to be used for control plane or user plane communications protocol stack between the aforementioned devices. In such embodiments, one or more protocol entities that may be implemented in one or more of UE 301, gNB 311, AMF, etc. may communicate with a respective peer protocol entity that may be implemented in or on another device using the services of respective lower layer protocol entities to perform such communication. In some embodiments, a gNB-CU of the gNB 311 may host the RRC 655, SDAP 647, and PDCP 640 of the gNB that controls the operation of one or more gNB-DUs, and the gNB-DUs of the gNB 311 may each host the RLC 630, MAC 620, and PHY 610 of the gNB 311.

In a first example, a control plane protocol stack may comprise, in order from highest layer to lowest layer, NAS 657, RRC 655, PDCP 640, RLC 630, MAC 620, and PHY 610. In this example, upper layers 660 may be built on top of the NAS 657, which includes an IP layer 661, an SCTP 662, and an application layer signaling protocol (AP) 663.

In NR implementations, the AP 663 may be an NG application protocol layer (NGAP or NG-AP) 663 for the NG interface 313 defined between the NG-RAN node 311 and the AMF, or the AP 663 may be an Xn application protocol layer (XnAP or Xn-AP) 663 for the Xn interface 312 that is defined between two or more RAN nodes 311.

The NG-AP 663 may support the functions of the NG interface 313 and may comprise Elementary Procedures (EPs). An NG-AP EP may be a unit of interaction between the NG-RAN node 311 and the AMF. The NG-AP 663 services may comprise two groups: UE-associated services (e.g., services related to a UE 301) and non-UE-associated services (e.g., services related to the whole NG interface instance between the NG-RAN node 311 and AMF). These services may include functions including, but not limited to: a paging function for the sending of paging requests to NG-RAN nodes 311 involved in a particular paging area; a UE context management function for allowing the AMF to establish, modify, and/or release a UE context in the AMF and the NG-RAN node 311; a mobility function for UEs 301 in ECM-CONNECTED mode for intra-system HOs to support mobility within NG-RAN and inter-system HOs to support mobility from/to EPS systems; a NAS Signaling Transport function for transporting or rerouting NAS messages between UE 301 and AMF; a NAS node selection function for determining an association between the AMF and the UE 301; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 311 via CN 320; and/or other like functions.

The XnAP 663 may support the functions of the Xn interface 312 and may comprise XnAP basic mobility procedures and XnAP global procedures. The XnAP basic mobility procedures may comprise procedures used to handle UE mobility within the NG RAN 311 (or E-UTRAN 410), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 301, such as Xn interface setup and reset procedures, NG-RAN update procedures, cell activation procedures, and the like.

In LTE implementations, the AP 663 may be an S1 Application Protocol layer (S1-AP) 663 for the S1 interface 313 defined between an E-UTRAN node 311 and an MME, or the AP 663 may be an X2 application protocol layer (X2AP or X2-AP) 663 for the X2 interface 312 that is defined between two or more E-UTRAN nodes 311.

The S1 Application Protocol layer (S1-AP) 663 may support the functions of the S1 interface, and similar to the NG-AP discussed previously, the S1-AP may comprise S1-AP EPs. An S1-AP EP may be a unit of interaction between the E-UTRAN node 311 and an MME 421 within an LTE CN 320. The S1-AP 663 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 663 may support the functions of the X2 interface 312 and may comprise X2AP basic mobility procedures and X2AP global procedures. The X2AP basic mobility procedures may comprise procedures used to handle UE mobility within the E-UTRAN 320, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 301, such as X2 interface setup and reset procedures, load indication procedures, error indication procedures, cell activation procedures, and the like.

The SCTP layer (alternatively referred to as the SCTP/IP layer) 662 may provide guaranteed delivery of application layer messages (e.g., NGAP or XnAP messages in NR implementations, or S1-AP or X2AP messages in LTE implementations). The SCTP 662 may ensure reliable delivery of signaling messages between the RAN node 311 and the AMF/MME 421 based, in part, on the IP protocol, supported by the IP 661. The Internet Protocol layer (IP) 661 may be used to perform packet addressing and routing functionality. In some implementations the IP layer 661 may use point-to-point transmission to deliver and convey PDUs. In this regard, the RAN node 311 may comprise L2 and L1 layer communication links (e.g., wired or wireless) with the MME/AMF to exchange information.

In a second example, a user plane protocol stack may comprise, in order from highest layer to lowest layer, SDAP 647, PDCP 640, RLC 630, MAC 620, and PHY 610. The user plane protocol stack may be used for communication between the UE 301, the RAN node 311, and UPF in NR implementations or an S-GW 422 and P-GW 423 in LTE implementations. In this example, upper layers 651 may be built on top of the SDAP 647, and may include a user datagram protocol (UDP) and IP security layer (UDP/IP) 652, a General Packet Radio Service (GPRS) Tunneling Protocol for the user plane layer (GTP-U) 653, and a User Plane PDU layer (UP PDU) 663.

The transport network layer 654 (also referred to as a "transport layer") may be built on IP transport, and the GTP-U 653 may be used on top of the UDP/IP layer 652 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 653 may be used for carrying user data within the GPRS core network and between the radio access network and the core network. The user data transported can be packets in any of IPv4, IPv6, or PPP formats, for example. The UDP/IP 652 may provide checksums for data integrity, port numbers for addressing different functions at the source and destination, and encryption and authentication on the selected data flows. The RAN node 311 and the S-GW 422 may utilize an S1-U interface to exchange user plane data via a protocol stack comprising an L1 layer (e.g., PHY 610), an L2 layer (e.g., MAC 620, RLC 630, PDCP 640, and/or SDAP 647), the UDP/IP layer 652, and the GTP-U 653. The S-GW 422 and the P-GW 423 may utilize an S5/S8a interface to exchange user plane data via a protocol stack comprising an L1 layer, an L2 layer, the UDP/IP layer 652, and the GTP-U 653. As discussed previously, NAS protocols may support the mobility of the UE 301 and the session management procedures to establish and maintain IP connectivity between the UE 301 and the P-GW 423.

Moreover, although not shown by FIG. 6, an application layer may be present above the AP 663 and/or the transport network layer 654. The application layer may be a layer in which a user of the UE 301, RAN node 311, or other network element interacts with software applications being executed, for example, by application circuitry 505. The application layer may also provide one or more interfaces for software applications to interact with communications systems of the UE 301 or RAN node 311. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 7:
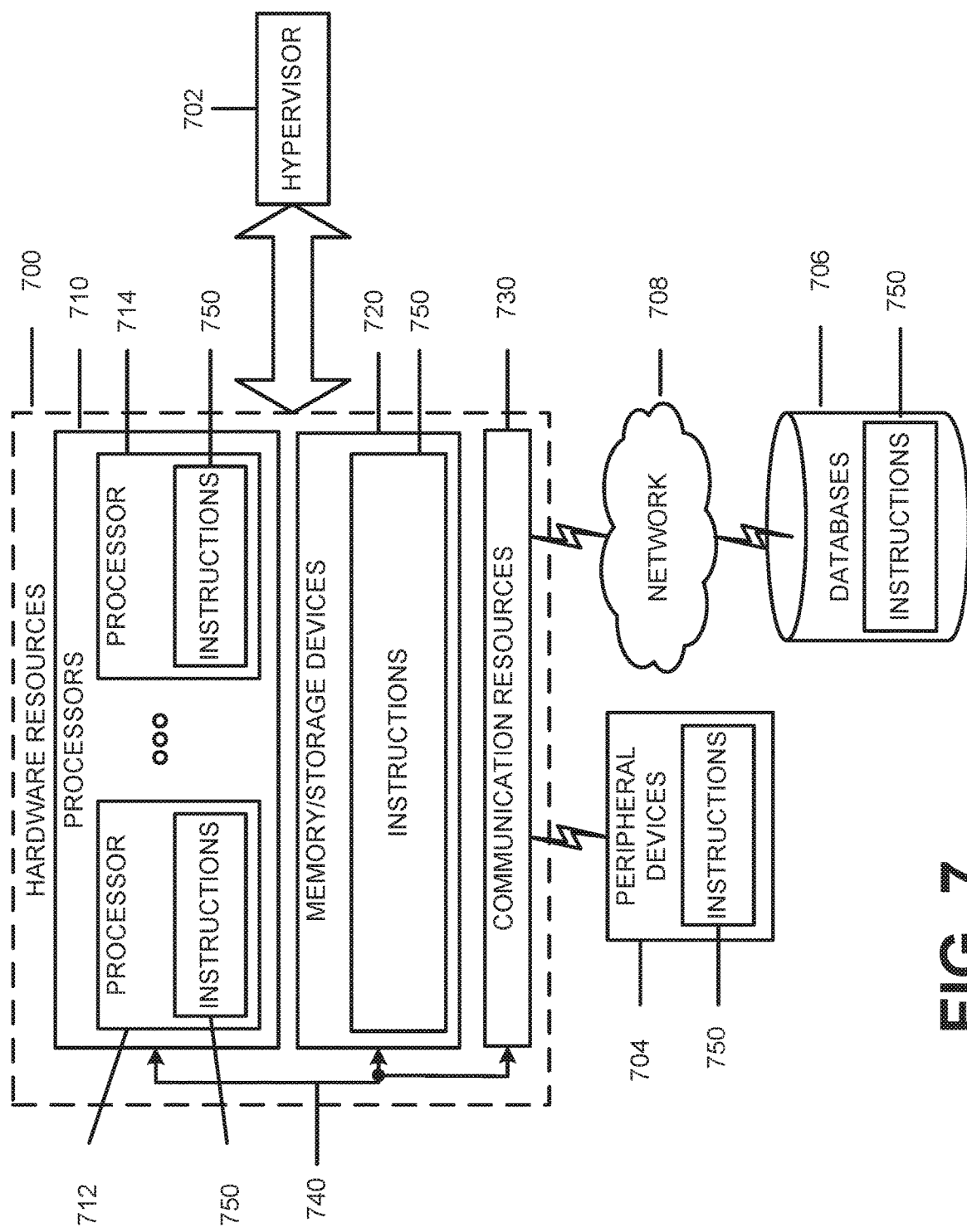
FIG. 7 is a block diagram illustrating components able to read instructions from a machine-readable or computer-readable medium (e.g., a non-transitory machine-readable storage medium) and perform any one or more of the methodologies described herein, according to some implementations of the present disclosure.

FIG. 7 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740. For embodiments where node virtualization (e.g., NFV) is utilized, a hypervisor 702 may be executed to provide an execution environment for one or more network slices/sub-slices to utilize the hardware resources 700.

The processors 710 may include, for example, a processor 712 and a processor 714. The processor(s) 710 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 720 may include main memory, disk storage, or any suitable combination thereof. The memory/storage devices 720 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 730 may include interconnection or network interface components or other suitable devices to communicate with one or more peripheral devices 704 or one or more databases 706 via a network 708. For example, the communication resources 730 may include wired communication components (e.g., for coupling via USB), cellular communication components, NFC components, Bluetooth® (or Bluetooth® Low Energy) components, Wi-Fi® components, and other communication components.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

What is claimed is:

1. A method comprising:
   receiving, from an integrated access and backhaul (TAB) central unit node, a Radio Resource Control (RRC) message that includes an uplink-downlink configuration setting;
   determining, using at least in part the uplink-downlink configuration setting from the RRC message, a new resource availability configuration for a backhaul resource associated with the IAB central unit node, wherein the new resource availability configuration includes a hard resource availability bitmap having one or more first bits and a soft resource availability bitmap having one or more second different bits, wherein each bit in the hard resource availability bitmap and the soft resource availability bitmap corresponds to a different backhaul resource associated with the IAB central unit node; and
   in response to determining the new resource availability configuration, conditionally communicating with the IAB central unit node over the backhaul resource according to the new resource availability configuration.

2. The method of claim 1, wherein the new resource availability configuration defines that the backhaul resource is hard available, and wherein communicating with the IAB central unit node over the backhaul resource according to the new resource availability configuration includes making the backhaul resource unconditionally available for transferring backhaul data.

3. The method of claim 1, wherein the new resource availability configuration defines that the backhaul resource is soft available, and wherein communicating with the IAB central unit node over the backhaul resource according to the new resource availability configuration includes making the backhaul resource conditionally available for transferring backhaul data.

4. The method of claim 1, wherein the new resource availability configuration defines that the backhaul resource is soft available, and wherein communicating with the IAB central unit node over the backhaul resource according to the new resource availability configuration includes making the backhaul resource unavailable for transferring backhaul data.

5. The method of claim 1, wherein a value of 1 in a bit in the hard resource availability bitmap indicates that the corresponding resource is unconditionally available for transferring backhaul data, and a value of 1 in a bit in the soft resource availability bitmap indicates that the corresponding resource is conditionally available for transferring backhaul data.

6. The method of claim 5, wherein a value of 0 in a bit in both the hard resource availability bitmap and the soft resource availability bitmap indicates that the corresponding resource is unavailable for transferring backhaul data.

7. The method of claim 1, wherein the backhaul resource includes one or more of: an uplink symbol, a downlink symbol, an uplink slot, or a downlink slot.

8. The method of claim 1, wherein the uplink-downlink configuration setting comprises a number of symbols in the new resource availability configuration that are either hard resources or soft resources.

9. The method of claim 1, comprising:
determining, using at least in part a second new resource availability configuration for a second backhaul resource associated with the IAB central unit node that includes a first parameter that indicates that the backhaul resource should not be hard available and a second different parameter indicates that the backhaul resource should not be soft available, that the second backhaul resource should be unavailable for transferring backhaul data; and
in response to determining that the second backhaul resource should be unavailable for transferring backhaul data, making the second backhaul resource unavailable for transferring backhaul data.

10. A method comprising:
determining, by an integrated access and backhaul (IAB) central unit node, a new resource availability configuration for a backhaul resource associated with an IAB node and a degree of availability of the backhaul resource;
generating, in response to determining that the new resource availability configuration that indicates that the backhaul resource is unavailable, a Radio Resource Control (RRC) message comprising the new resource availability configuration for the backhaul resource in an uplink-downlink configuration setting that includes a first parameter that indicates that the backhaul resource is not hard available and a second different parameter indicates that the backhaul resource is not soft available; and
transmitting the RRC message that includes the uplink-downlink configuration setting to the IAB node.

11. The method of claim 10, wherein the new resource availability configuration defines that a second backhaul resource is hard available, and wherein the new resource availability configuration directs the IAB node to make the second backhaul resource unconditionally available for transferring backhaul data.

12. The method of claim 10, wherein the new resource availability configuration defines that a second backhaul resource is soft available, and wherein the new resource availability configuration directs the IAB node to make the second backhaul resource conditionally available for transferring backhaul data.

13. The method of claim 10, wherein the new resource availability configuration defines that a second backhaul resource is unavailable, and wherein the new resource availability configuration directs the IAB node to make the second backhaul resource unavailable for transferring backhaul data.

14. The method of claim 10, wherein the new resource availability configuration includes a hard resource availability bitmap having one or more bits and a soft resource availability bitmap having one or more bits, wherein each bit in the hard resource availability bitmap and the soft resource availability bitmap corresponds to a different backhaul resource associated with the IAB node.

15. The method of claim 14, wherein a value of 1 in a bit in the hard resource availability bitmap indicates that the corresponding resource is unconditionally available for transferring backhaul data, and a value of 1 in a bit in the soft resource availability bitmap indicates that the corresponding resource is conditionally available for transferring backhaul data.

16. The method of claim 15, wherein a value of 0 in a bit in both the hard resource availability bitmap and the soft resource availability bitmap indicates that the corresponding resource is unavailable for transferring backhaul data.

17. The method of claim 10, wherein the backhaul resource includes one or more of: an uplink symbol, a downlink symbol, an uplink slot, or a downlink slot.

18. The method of claim 10, comprising communicating, at least in part in response to transmitting the RRC message that includes the uplink-downlink configuration setting to the IAB node, with the IAB node over the backhaul resource according to the new resource availability configuration.

19. An apparatus for an integrated access and backhaul (TAB) network comprising a non-transitory computer-readable storage device having stored thereon instructions, which, when executed by one or more processors, cause the one or more processors to perform operations comprising:
receiving, from an TAB central unit node, a Radio Resource Control (RRC) message that includes an uplink-downlink configuration setting;
determining, using at least in part the uplink-downlink configuration setting from the RRC message, a new resource availability configuration for a backhaul resource associated with the TAB central unit node, wherein the new resource availability configuration includes a hard resource availability bitmap having one or more first bits and a soft resource availability bitmap having one or more second different bits, wherein each bit in the hard resource availability bitmap and the soft resource availability bitmap corresponds to a different backhaul resource associated with the TAB central unit node; and
in response to determining the new resource availability configuration, conditionally communicating with the TAB central unit node over the backhaul resource according to the new resource availability configuration.

20. The apparatus of claim 19, wherein the new resource availability configuration defines that the backhaul resource is hard available, and wherein communicating with the TAB central unit node over the backhaul resource according to the new resource availability configuration includes making the backhaul resource unconditionally available for transferring backhaul data.

* * * * *

UNITED STATES PATENT AND TRADEMARK OFFICE
CERTIFICATE OF CORRECTION

PATENT NO. : 11,696,187 B2
APPLICATION NO. : 17/442003
DATED : July 4, 2023
INVENTOR(S) : Honglei Miao It is certified that error appears in the above-identified patent and that said Letters Patent is hereby corrected as shown below:

On the Title Page

Item (56), Other Publications, Line 2, Delete "Network: NR:" and insert -- Network; NR; --;

Item (56), Other Publications, Line 4, Delete "VI 5.4.0," and insert -- V15.4.0, --;

In the Claims

Column 28, Line 31, In Claim 1, delete "(TAB)" and insert -- (IAB) --;

Column 30, Line 36, In Claim 19, delete "(TAB)" and insert -- (IAB) --;

Column 30, Line 40, In Claim 19, delete "TAB" and insert -- IAB --;

Column 30, Line 46, In Claim 19, delete "TAB" and insert -- IAB --;

Column 30, Line 53, In Claim 19, delete "TAB" and insert -- IAB --;

Column 30, Line 57, In Claim 19, delete "TAB" and insert -- IAB --;

Column 30, Line 62, In Claim 20, delete "TAB" and insert -- IAB --.

Signed and Sealed this
Twenty-fourth Day of October, 2023

Katherine Kelly Vidal
*Director of the United States Patent and Trademark Office*